(No Model.) 2 Sheets—Sheet 1.

W. W. BRADY.
BEAN PLANTER.

No. 443,816. Patented Dec. 30, 1890.

Witnesses:
F. Merriam.
C. G. Cramell.

Inventor:
Wm. W. Brady,
By Geo. B. Selden,
Atty.

(No Model.) 2 Sheets—Sheet 2.
W. W. BRADY.
BEAN PLANTER.
No. 443,816. Patented Dec. 30, 1890.
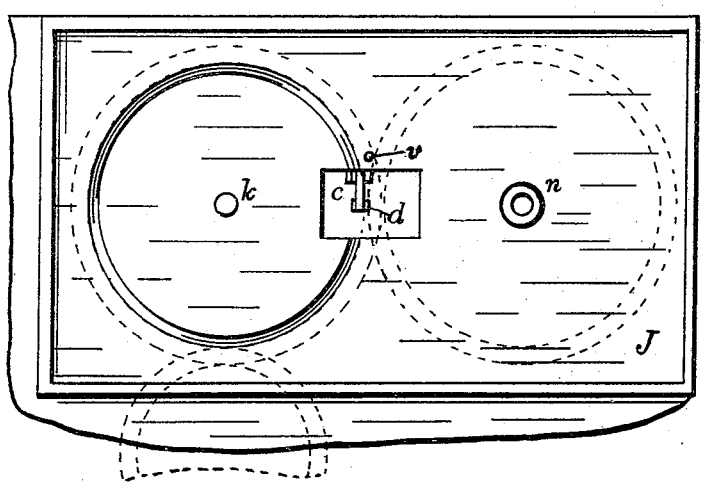
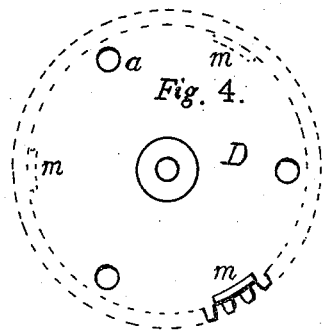
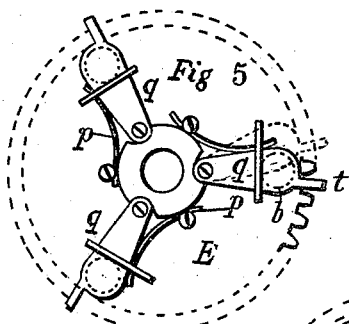
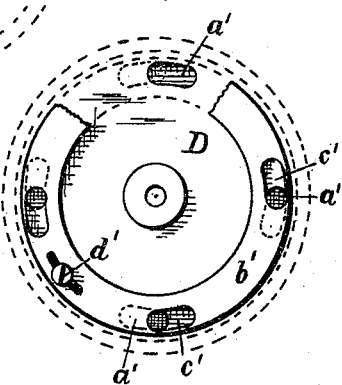
Witnesses:
F. Merriam.
C. G. Cranwell.
Inventor:
Wm. W. Brady,
By Geo. B. Selden,
atty.

UNITED STATES PATENT OFFICE.

WILLIAM W. BRADY, OF GENESEO, NEW YORK.

BEAN-PLANTER.

SPECIFICATION forming part of Letters Patent No. 443,816, dated December 30, 1890.

Application filed December 5, 1889. Serial No. 332,645. (No model.)

*To all whom it may concern:*

Be it known that I, WILLIAM W. BRADY, a citizen of the United States, residing at Geneseo, in the county of Livingston and State of New York, have invented an Improved Machine for Planting Beans, of which the following is a specification, reference being had to the accompanying drawings.

My invention relates to an improved machine for planting beans and fertilizer at the same time by means of the improved devices, which are fully described and illustrated in the following specification and the accompany drawings, the novel features thereof being specified in the claims annexed to the said specification.

My improved bean-planter and fertilizer-distributer is represented in the accompanying drawings, in which—

Figure 1:
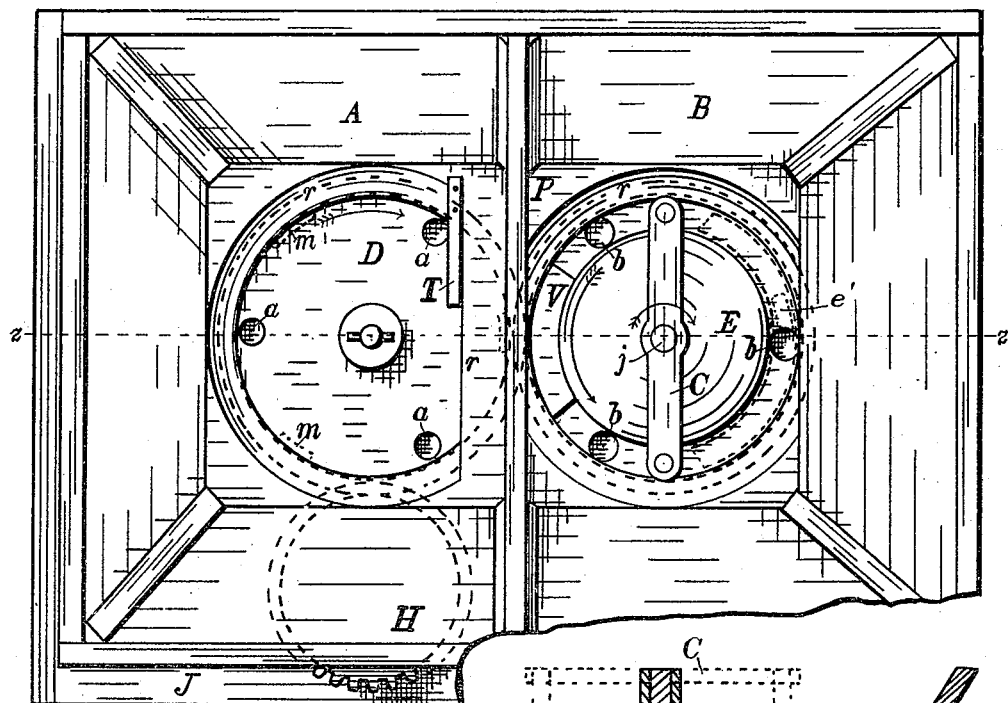
Figure 2:
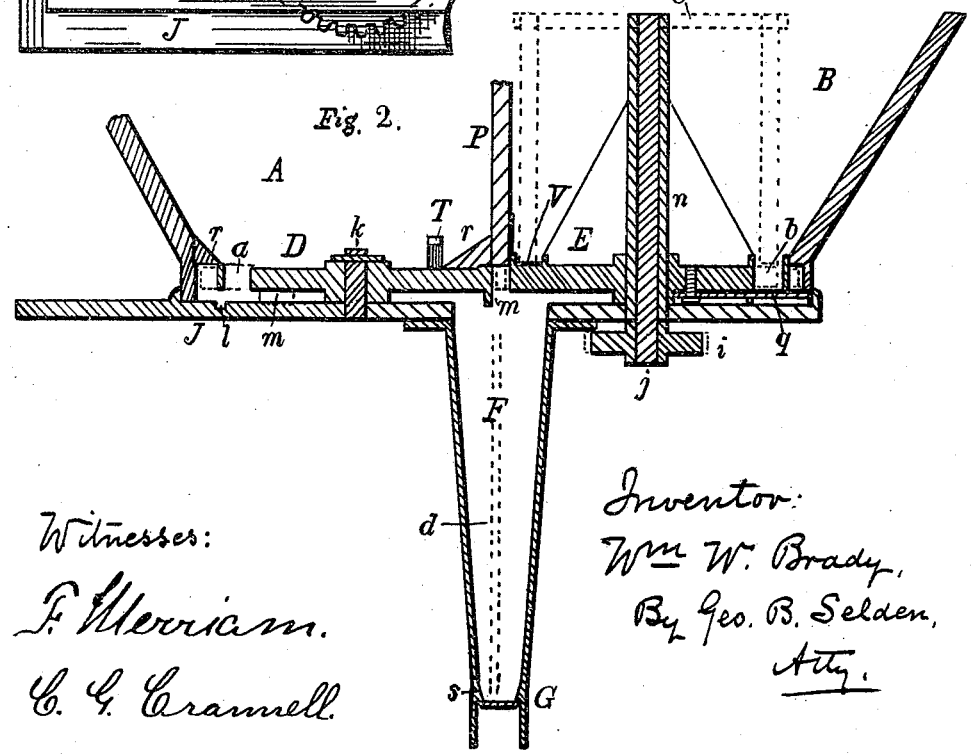

Figure 1 is a plan view. Fig. 2 is a vertical section on the line $z\, z$, Fig. 1. Fig. 3 is a plan view of the base-plate, the hopper and feed-wheels being removed. Fig. 4 is an inverted view of the bean-feeding wheel. Fig. 5 is an inverted view of the fertilizer-feeding wheel. Fig. 6 is a vertical section through the dropping-tube, taken at right angles with the section shown in Fig. 2. Fig. 7 is a plan view of the bean-feeding wheel, showing the means for regulating the feed.

My improved bean-planter and fertilizer-distributer is represented in the accompanying drawings, in which A is the bean-hopper; B, the fertilizer or phosphate hopper; C, the revolving stirrer in the latter, and D and E the bean and fertilizer distributing wheels, respectively. The feeding-wheels are provided with openings $a\, a\, a$ and $b\, b\, b$, which feed the beans and fertilizer into the dropping-tube F, from which they are discharged simultaneously by the operation of the secondary dropper G, which is actuated by a cam on the feed-wheel B, through the bell-crank lever $c$ and rod $d$. The feeding-wheels are provided with teeth around their rims, which engage together and cause the wheels to revolve simultaneously. One of the feeding-wheels receives motion from the pinion H, which is driven from the axle of the machine by a bevel-gear meshing with a bevel-gear on a shaft which passes through the supporting-plate J and has the pinion H secured to its upper end. The hopper or its base-plate is cut away to permit the pinion H to mesh with the teeth of the feed-wheel D. The stirrer C in the fertilizer-hopper is driven in the contrary direction to that in which the fertilizer-feed wheel E revolves, as indicated by the arrows in Fig. 1, by means of a chain and sprocket-wheels or suitable gearing and pinion $i$, attached to the lower end of the shaft $j$, which passes upward through the feed-wheel and carries the stirrer at its upper end. Any suitable arrangement of gearing may, however, be employed to drive the stirrer, and such gearing may be supported by any suitable frame-work attached to the base-plate.

The base-plate J of the hopper is made of any suitable shape or dimensions, being provided with a stud $k$, on which the bean-feeder D revolves, an annular groove $l$, in which the lugs $m\, m$ on the lower side of the bean-wheel travels, and a hollow post $n$, through which the shaft $j$ of the stirrer C passes. The base-plate is also provided with an opening immediately above the dropping-tube through which both the beans and the fertilizer descend into the tube. The base-plate is also provided with a lug or pin $v$, which trips the movable plates $q$ on the lower side of the fertilizer-wheel by contact with the projections $t$, so that the fertilizer in the orifices $b\, b\, b$ is delivered into the dropping-tube. The division-plate P separates the hoppers from each other. The walls of the hoppers are provided with inwardly-projecting guards or flanges $r$, which project over the teeth of the feeding-wheels, so as to prevent the beans or fertilizer from clogging the teeth. Any suitable number of the feed-openings $a\, a\, a\, b\, b\, b$ may be used in the feeding-wheels, varying with the speed at which the wheels are driven relatively to the axle by means of the bevel-gears, which may be so arranged that the speed may be altered at will. The feed-wheel D is provided on its lower side with projecting lugs $m$, which correspond in number with the feed-openings $a$, and which operate the secondary dropper G by means of the lever $c$ and rod $d$. The dropping-tube is provided with an internal collar $s$, against the lower edge of which the valve G fits, so as to hold the seeds and fertilizer until discharged by the opening of the valve by one of the lugs $m$ striking against the upper end of the bell-crank lever $c$.

T is a brush inserted in the bean-hopper and bearing on the upper surface of the feeding-wheel D to brush the beans into the openings $a$.

V is a plate, which projects in over the fertilizer-wheel to prevent the fertilizer from entering the openings $b$ while they are passing over the entrance into the dropping-tube F.

The plates $q$ are pivoted on the lower side of the feeding-wheel E, being provided with springs $p$, by which they are returned to the position in which they close the bottoms of the openings $b$. A spring $x$, Fig. 6, is arranged in any suitable manner and serves to hold the valve G closed, except when it is opened by the action of the cams $m$, lever $c$, and rod $d$, which is pivoted to the valve at its lower end. The valve itself is hinged to the dropping-tube F in any suitable way. The dropping-tube delivers the beans and fertilizer to a suitable tooth or drill tube, which is attached to the frame of the machine and forms a furrow in the earth.

In Fig. 7 I have represented the manner of adjusting or varying the size of the openings $a'$ in the bean-feeding wheel D, so as to control the quantity of beans fed into any one hill. The openings $a'$ (which may be of any desired number corresponding with the openings in the fertilizer-feed wheel E) are elongated, and a flat ring $b'$, provided with elongated openings $c'$, is arranged on the upper side of the wheel, so that it may be adjusted to alter the effective size of the openings $a'$. The ring $b'$ is held in place in any position to which it may be adjusted by the screw $d'$, passing through a slot in the ring. A similar ring may be applied to the fertilizer-feed wheel E, so as to vary the amount of fertilizer fed into the hills, as indicated by the dotted lines $e'$, Fig. 1.

I claim—

1. The combination, with the hoppers A and B, of the revolving perforated feeding-wheels D and E, the stirrer C, arranged to revolve in a direction opposite to the feeding-wheel E, the dropping-tube F, and the secondary dropper G, operated by suitable connections from one of the feeding-wheels, substantially as described.

2. The combination, with the hoppers A and B, of the revolving perforated feeding-wheels D and E, the dropping-tube F, secondary dropper G, the stirrer C, arranged to revolve in a direction opposite to the feed-wheel E, the pivoted plate $q$ on the lower side of the wheel, and the pin or stop $p$, substantially as described.

WILLIAM W. BRADY.

Witnesses:
 GEO. B. SELDEN,
 C. G. CRANNELL.